N. BLIMER & P. ECKEL.
Thistle-Extractors.
No. 156,203. Patented Oct. 27, 1874.
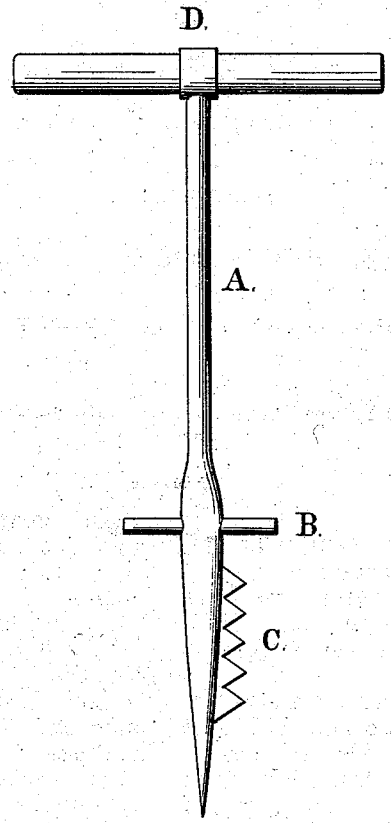

UNITED STATES PATENT OFFICE.

NICOLAS BLIMER AND PHILIP ECKEL, OF PORT WASHINGTON, WIS.

IMPROVEMENT IN THISTLE-EXTRACTORS.

Specification forming part of Letters Patent No. 156,203, dated October 27, 1874; application filed August 13, 1874.

*To all whom it may concern:*

Be it known that we, NICOLAS BLIMER and PHILIP ECKEL, of Port Washington, in the county of Ozaukee, in the State of Wisconsin, have invented certain Improvements in Thistle-Extractors, of which the following is a specification:

Our invention is for extracting and exterminating thistles, and is accomplished by a tool with projections on its side and lugs on which to place the foot and thrust it into the ground, and, by turning it round with the handle, the projections will make the hole larger, and the thistle can be extracted roots and all together.

Figure 1 is a view of the extractor.

A is the shank of the extractor; B, the lugs on the side of the extractor, to put the foot onto and to force it into the ground; C, the projections on the side of the extractor, which, when it is turned, will enlarge the hole and loosen the earth round the roots of the thistle; D, a thimble in the end of the shank, in which is a handle to turn the extractor with.

This machine is very simple. Place the point of it by the side of a thistle, and then place the foot on the lug B, and force it into the ground, and then with the handle turn it round, and the dirt will be loosened so that the thistle can be pulled out.

We claim as our invention—

A thistle-extractor constructed with shank A, lugs B, and projections C, substantially as specified.

NICOLAS BLIMER.
PHILIP ECKEL.

Witnesses:
    J. B. SMITH,
    E. J. SMITH.